(12) United States Patent
Jeng

(10) Patent No.: US 12,305,780 B1
(45) Date of Patent: May 20, 2025

(54) PIPE JOINT ASSEMBLIES

(71) Applicant: DAOZ International Holding Limited, Wan Chai (HK)

(72) Inventor: Sheng-Hun Jeng, HsinChu (TW)

(73) Assignee: DOAZ INTERNATIONAL HOLDING LIMITED, Wan Chai (HK)

( * ) Notice: Subject to any disclaimer, the term of this patent is extended or adjusted under 35 U.S.C. 154(b) by 0 days.

(21) Appl. No.: 18/514,294

(22) Filed: Nov. 20, 2023

(51) Int. Cl.
  *F16L 37/14* (2006.01)
  *F16L 21/03* (2006.01)
  *F16L 21/06* (2006.01)

(52) U.S. Cl.
  CPC ............. *F16L 21/03* (2013.01); *F16L 21/06* (2013.01)

(58) Field of Classification Search
  CPC ......... F16L 21/02; F16L 21/022; F16L 21/03; F16L 21/065; F16L 21/06; F16L 23/04; F16L 23/08; F16L 23/10; F16L 23/12; F16L 23/16; F16L 23/18; F16L 23/20; F16L 23/22; F16L 23/162; F16L 37/1225; F16L 37/14; F16L 37/142; F16L 37/144; F16L 17/06; F16L 17/063; F16L 17/067
  USPC .................................. 285/336, 337; 277/614
  See application file for complete search history.

(56) References Cited

U.S. PATENT DOCUMENTS

| 2,050,137 A * | 8/1936 | Walsh ................. F16L 19/0218 |
| | | 277/614 |
| 2012/0074694 A1* | 3/2012 | Butte ...................... F16L 23/12 |
| | | 277/609 |

* cited by examiner

*Primary Examiner* — Aaron M Dunwoody
(74) *Attorney, Agent, or Firm* — MUNCY, GEISSLER, OLDS & LOWE, P.C.

(57) ABSTRACT

A pipe joint assembly has a gasket, pipes and a receptacle. The gasket has a through hole encircled by protrusions on two sides of the gasket. Each of the pipes has a terminal with grooves on a connecting surface to fit the protrusions of the gasket. The receptacle contains an assembly of the terminals and the gasket. The protrusions have terraces to leave space to induce the effect of the suction cups between the gasket and the pipe.

17 Claims, 10 Drawing Sheets

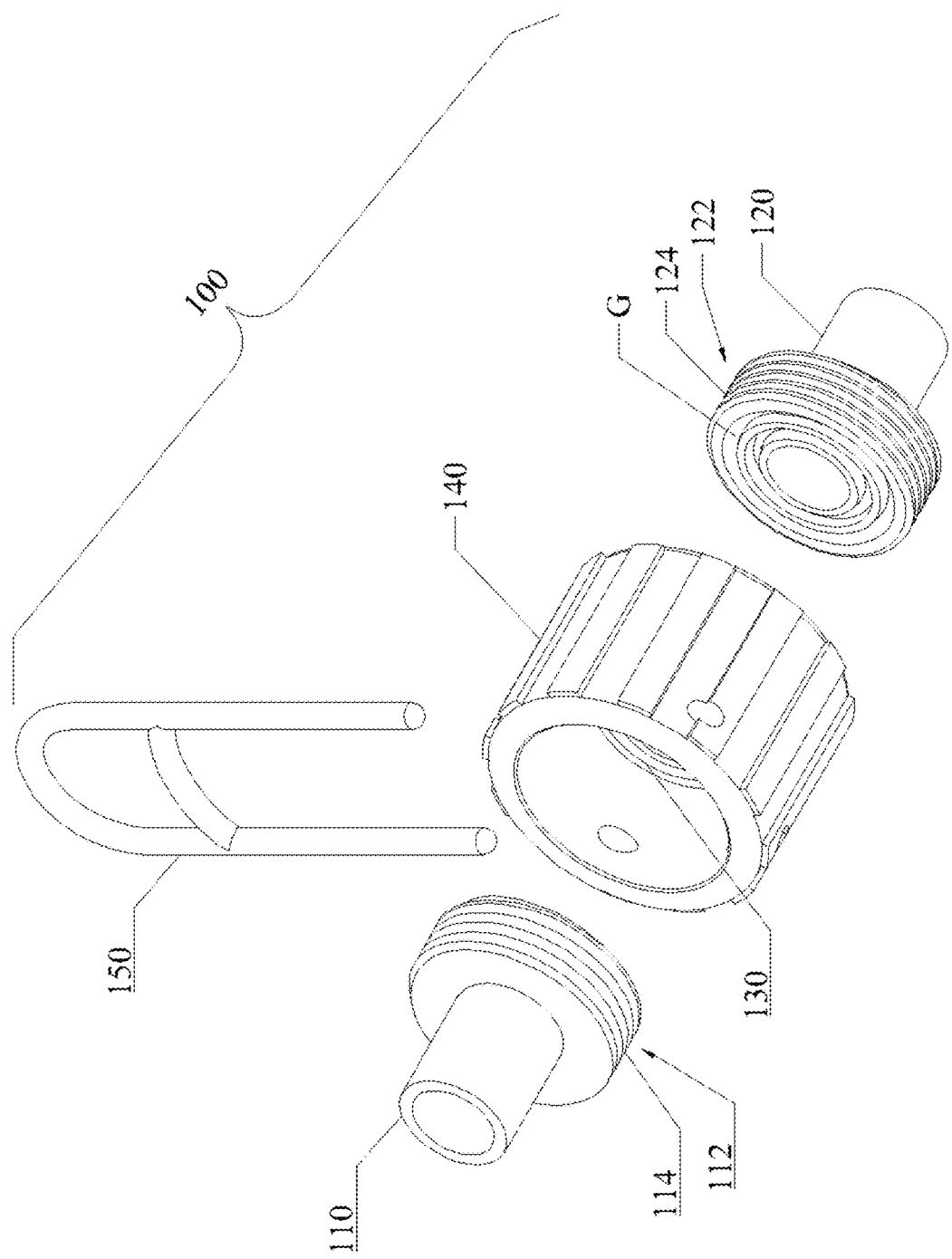

PIPE JOINT ASSEMBLIES

FIELD

The present application relates to pipe joint assemblies, and more particularly to those for transporting fluid such as chemical solution, water or the like.

BACKGROUND OF THE INVENTION

The transportation of chemical solutions or water are required in many manufacturing processes, for example, when a pharmaceutical factory produces drugs, or when a semiconductor factory coats the surface of a wafer to form a film of uniform thickness. Therefore, pipes and the connectors for pipes are required for many industries. However, as factories and machines become more sophisticated, the space available for installing and replacing pipes becomes smaller and smaller. Therefore, there is the lack of space to allow the movement of a pipe to be inserted into or pulled out of the connector. Therefore, there is a requirement for a new pipe joint assembly to solve such problem.

For example, PFA (Perfluoroalkoxy) pipes are popular in production of chemical, pharmaceutical, food, and semiconductor, and the traditional PFA pipe joints require special processes, and the quality of the construction affects its service life and the stability. Further, when two PFA pipes are connected during the installation process, displacement space in the direction parallel to the pipe is required to allow a pipe to be inserted into or pulled out of a connector. The lack of space will cause the difficulty to disassemble and assemble the pipe joint assembly, and the pipes cannot be removed from the joint during the installation and maintenance. If a pipe is installed forcibly, other connected pipes may be pulled violently to be damaged. Moreover, a hot air gun, expander, cleaning cloth, water, protective glasses, etc. are required to cut the PFA pipe, heat the PFA, and then insert the expander. This traditional installation is time-consuming, laborious and costly.

SUMMARY OF THE INVENTION

The traditional pipe joint assembly requires space to allow a pipe inserted into or pulled out of a connector in a direction parallel to the pipe. The pipe joint assembly of the present disclosure solve the problem of the lack of space with a structure allowing a pipe inserted into or pulled out of a connector in a direction perpendicular to the pipe.

One aspect of the present disclosure provides a pipe joint assembly comprising a gasket, pipes and a receptacle. The gasket has a through hole encircled by protrusions on two sides of the gasket. Each of the pipes has a terminal with grooves on a first connecting surface to fit the protrusions of the gasket. A sleeve contains the terminals and the gasket.

Another aspect of the present disclosure provides a pipe joint assembly comprising a gasket, pipes and a receptacle. The gasket has a through hole encircled by protrusions on two sides of the gasket. Each of the pipes has a terminal with grooves on a first connecting surface to fit the protrusions of the gasket. A clamp contains the terminals and the gasket.

Another aspect of the present disclosure provides a pipe joint assembly comprising a gasket, pipes and a receptacle. The gasket has a through hole encircled by protrusions on two sides of the gasket. Each of the pipes has a terminal with grooves on a first connecting surface to fit the protrusions of the gasket. The receptacle contains an assembly of the terminals and the gasket. The protrusions have terraces to leave space to generate the effect of the suction cups between the gasket and the first pipe.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF DRAWINGS

A more complete understanding of the present disclosure may be derived by referring to the detailed description and claims when considered in connection with the example embodiments shown in the drawings, in which:

FIG. 2 is an exploded view of the assembly in FIG. 1 including a connector, a gasket and pipes;

DETAILED DESCRIPTION OF THE INVENTION

Figure 1:
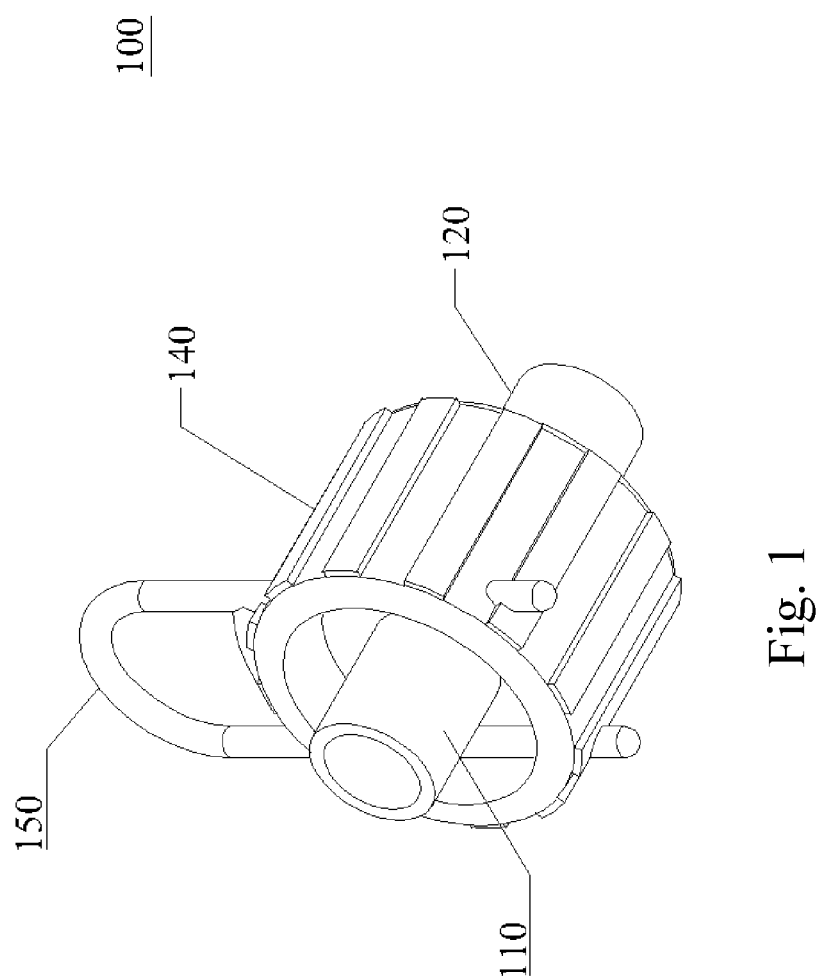
FIG. 1 is a perspective view of an assembly of connector according to an embodiment of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral. It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept. The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

A pipe joint assembly according to an embodiment of the present disclosure will be described with reference to the drawings. The present invention will be described in detail below with reference to the accompanying drawings. As used herein, the element "pipe" is intended to include "tubing" as well.

FIG. 1 is a perspective view of a pipe joint assembly 100 according to an embodiment of the present disclosure. FIG. 2 is an exploded view of the pipe joint assembly 100 in FIG. 1. A pipe joint assembly 100 comprises a first pipe 110, a second pipe 120, a gasket 130, and a sleeve 140. The first pipe 110 has a first terminal 112, and the second pipe 120 has a second terminal 122. Both the first terminal 112 and the second terminal 122 have grooves G on connecting surfaces. Optionally, the grooves G are concentrically circular. As an example not the limitation, the pin 150 is U-shaped, and is inserted into the sleeve 140 through two ends.

Figures 3A, 3B:
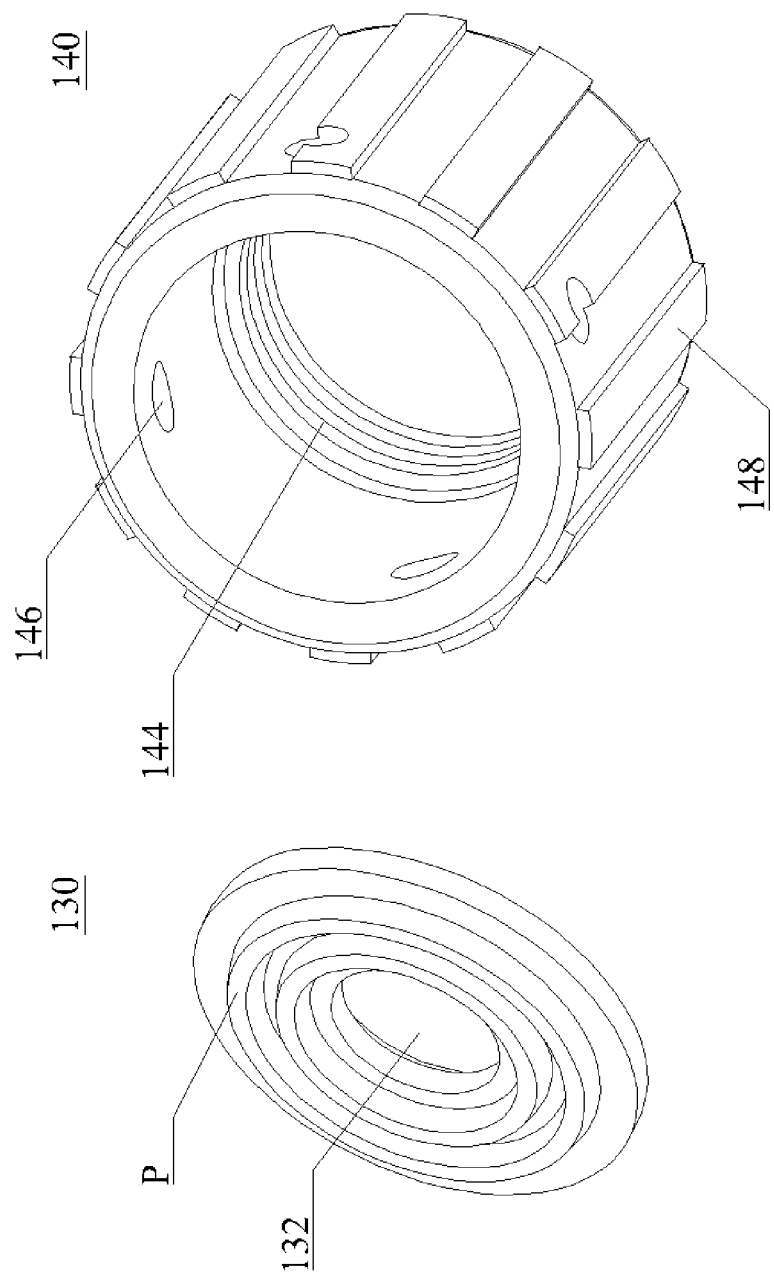
FIG. 3a is a perspective view of a gasket of the assembly in FIG. 2.
FIG. 3b is a perspective view of a pipe joint assembly of the assembly in FIG. 2.

FIG. 3a is a perspective view of the gasket 130 of the assembly in FIG. 2. The gasket 130 has a through hole 132 encircled by protrusions P on two sides. The grooves (not shown) of the first terminal 112 of the first pipe 110 shown in FIG. 2 fit the protrusions P of the gasket 130 shown in FIG. 3a. The grooves G of the second terminal 122 of the second pipe 120 shown in FIG. 2 fit the protrusions P of the gasket 130 shown in FIG. 3a. Optionally, the protrusions P are concentrically circular.

FIG. 3b is a perspective view of the sleeve 140 of the assembly in FIG. 2. The sleeve 140 contains an assembly of the first terminal 112, the second terminal 122 and the gasket 130 as shown in FIGS. 1 and 2. Optionally, the sleeve 140 has a texture, for example, protrusions 148, on an outer wall to provide friction when the sleeve 140 is rotated to engage or disengage the second terminal 122.

Figure 4:
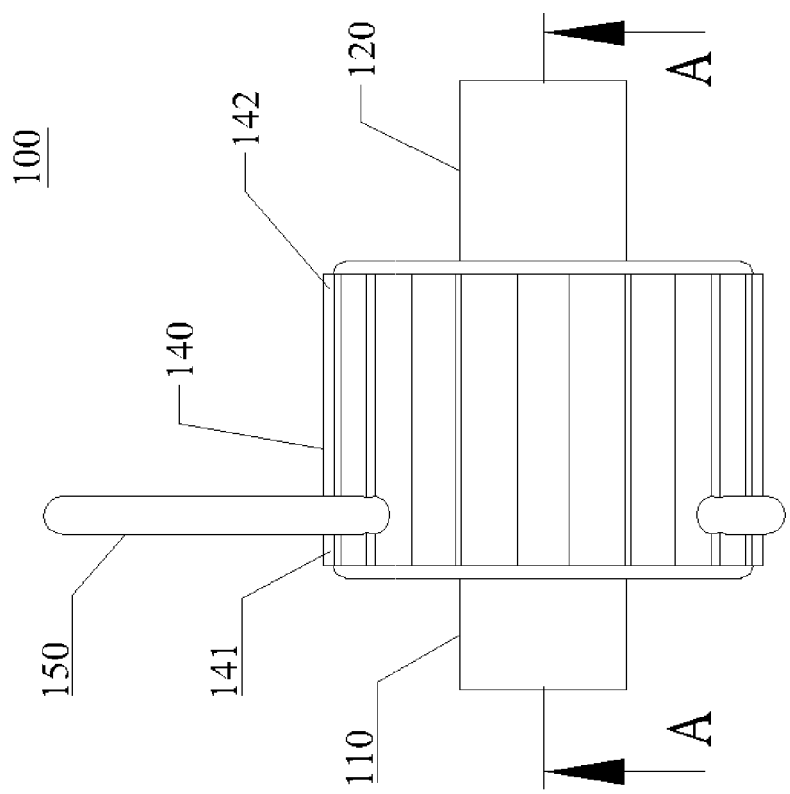
FIG. 4 is a side view of an assembly indicating a cross-section A-A according to an embodiment of the present disclosure.
Figure 5:
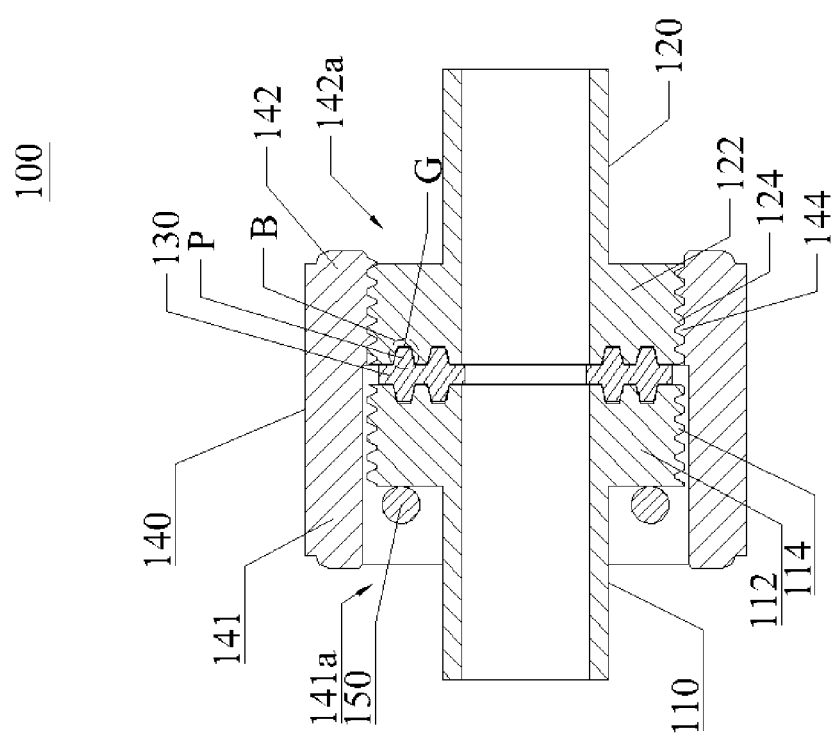
FIG. 5 is a cross-sectional view of the assembly in the cross-section A-A of FIG. 4.

FIG. 4 is a side view of an assembly indicating a cross-section A-A according to an embodiment of the present disclosure, and FIG. 5 is a cross-sectional view of the assembly in the cross-section A-A of FIG. 4. As shown in FIG. 5, the sleeve 140 has a first opening 141a at a first end 141 without threads and a second opening 142a at a second end 142 with threads on an inner wall. The second terminal 122 has threads 124 to fit the threads 144 of the second end 142 of the sleeve 140 from the second opening 142a. The first terminal 112 has threads 114 the same as the threads of the second terminal 122, and thus the first terminal 112 is prevented from being threaded into the second end 142 of the sleeve 140 from the first opening 141a. Further, because only the inner wall of the second end 142 of the sleeve 140 has threads 144, such structure allows the sleeve 140 moved to contain the second pipe 120 while the first terminal 112 and the second terminal 122 have the same threads and both of them have to be installed into the sleeve 40. While the sleeve 140 is moved to contain only the second pipe 120, the first terminal 112 is free from the restriction of the sleeve 140 and can be moved in the direction perpendicular to the first pipe 110. To fix the first pipe 110 with the sleeve 140, a pin 150 is inserted into the first end 141 of the sleeve 140 as shown in FIG. 4, and thus the first terminal 112 is prevented from disengaging the sleeve 140 as shown in FIG. 5.

Figure 6:
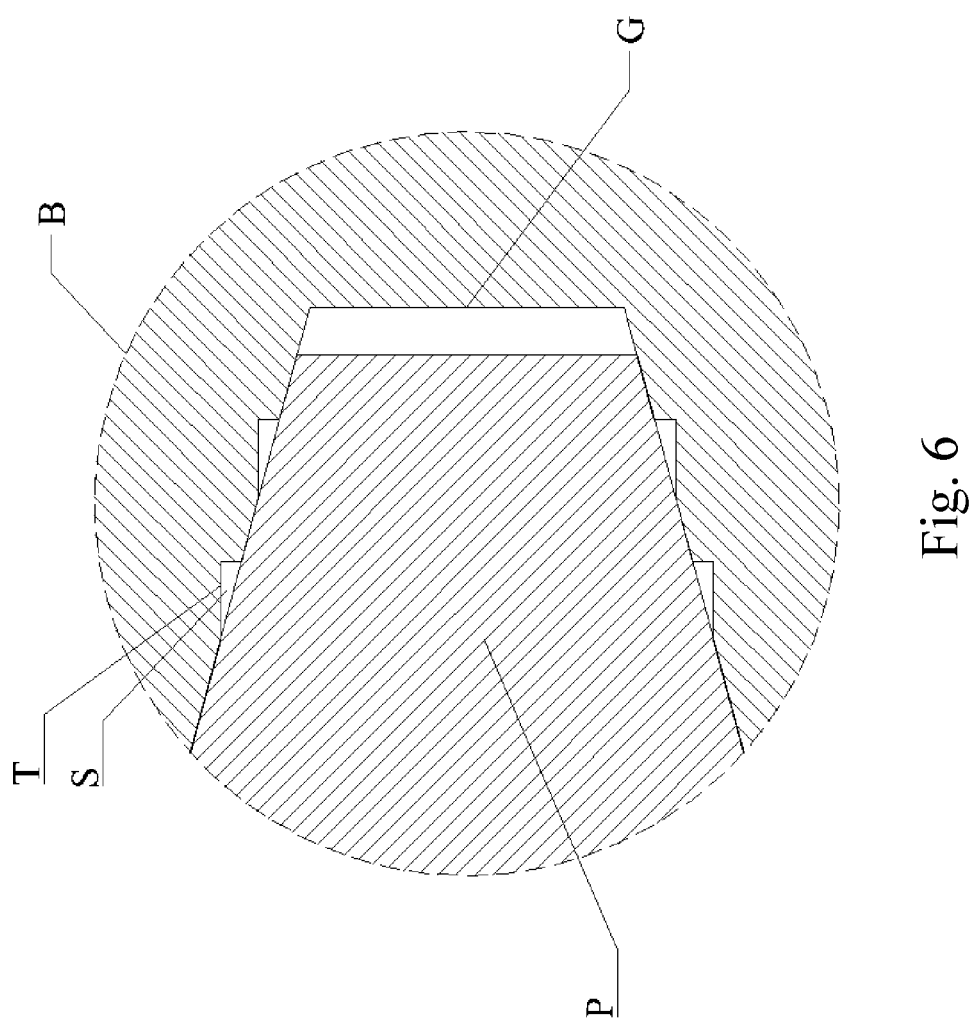
FIG. 6 is an enlarged view showing a detail structure in Area B of the cross-sectional view of the assembly of FIG. 5.

FIG. 6 is an enlarged view showing a detail structure in Area B of the cross-sectional view of the assembly of FIG. 5. The grooves G have terraces T to leave space S between the gasket and the pipes. The gasket is flexible to compress the space S between the gasket and the pipes when the pipes are pushed to the gasket. Alternatively, the terraces T can be on the protrusions P of the gasket to result in the same effect of the suction cup. The suction on the connecting surfaces of the gasket or the pipes benefits the coupling of the pipes.

Figure 7:
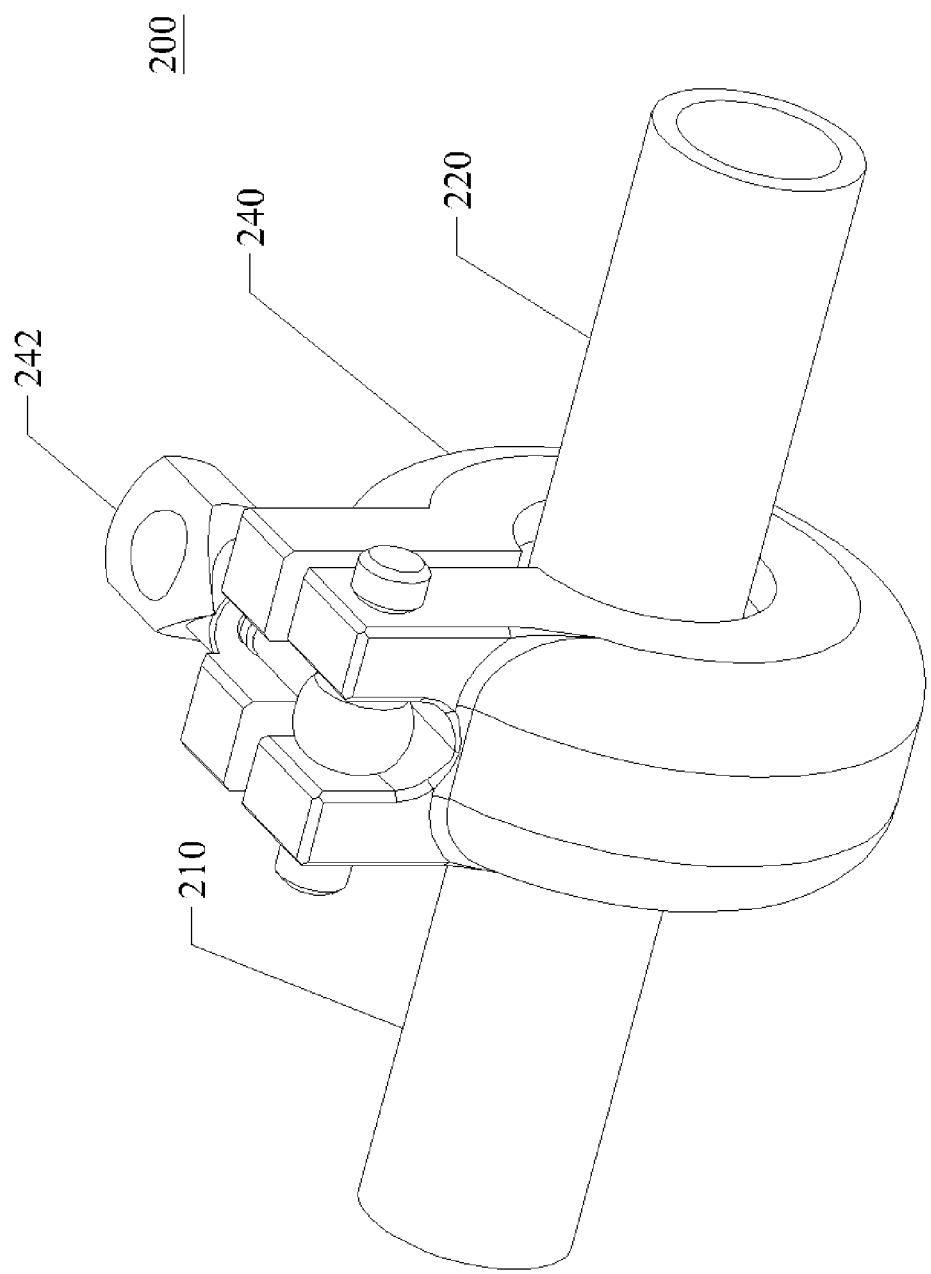
FIG. 7 is a perspective view of an assembly of connector according to another embodiment of the present disclosure.

FIG. 7 is a perspective view of an assembly of connector 200 according to another embodiment of the present disclosure. A clamp 240 is used to couple a first pipe 210 and a second pipe 220. A bolt 242 is used to close the clamp 240. The clamp 240 is flexible and is C-shaped.

Figure 8:
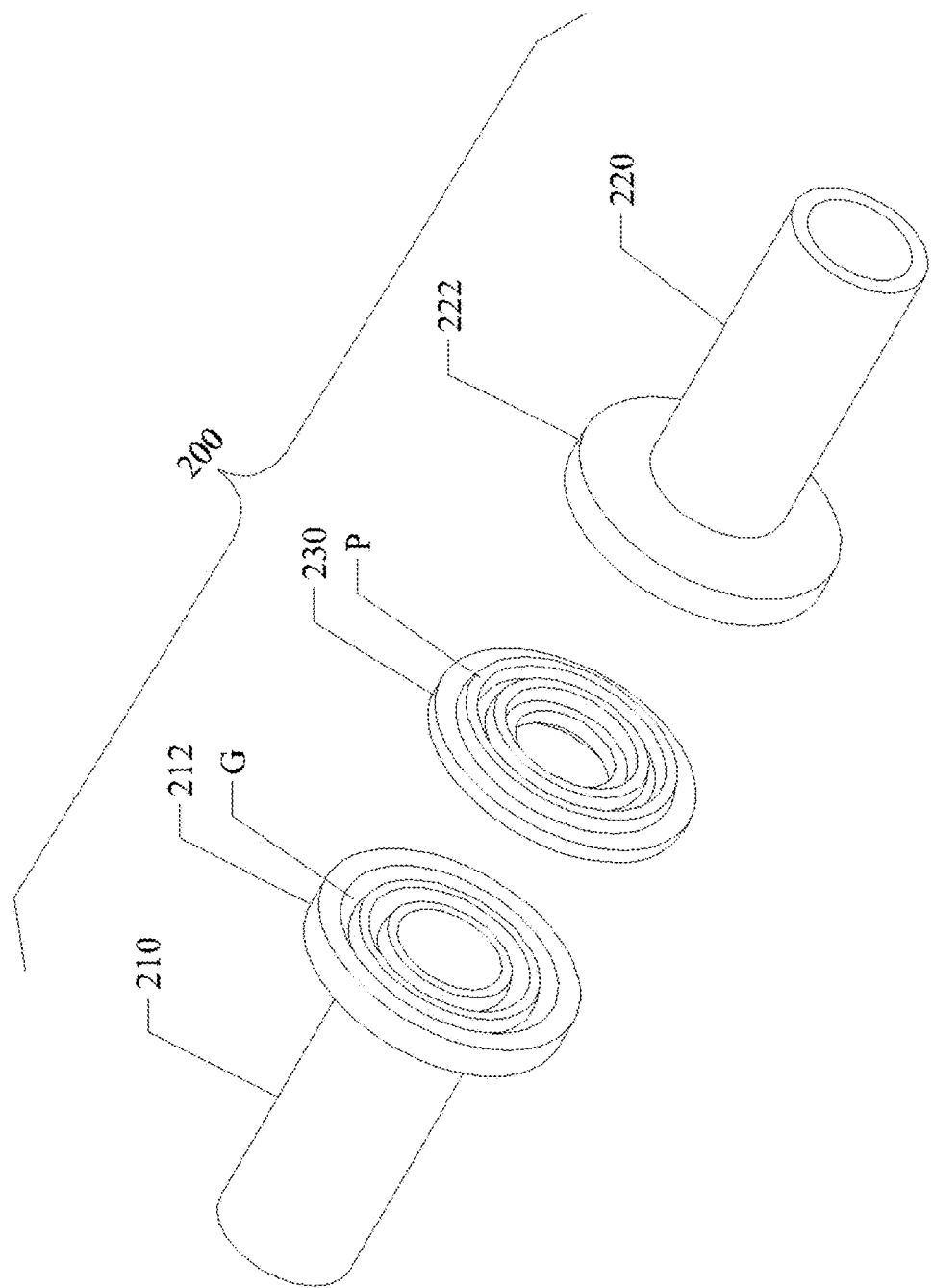
FIG. 8 is an exploded view of the assembly in FIG. 7 excluding a clamp but including a gasket and pipes.

FIG. 8 is an exploded view of the assembly 200 in FIG. 7 excluding a clamp but including the first pipe 210, the second pipe 220, and a gasket 230. The gasket 230 has a through hole encircled by protrusions P on two sides. Both the first terminal 212 and the second terminal 222 have grooves G on connecting surfaces to fit the protrusions P of the gasket 230. Optionally, the protrusions P and the grooves G are concentrically circular. Similar to the embodiment of FIG. 6, the grooves G have terraces T to leave space S between the gasket and the pipes. The gasket is flexible to compress the space S between the gasket and the pipes when the pipes are pushed to the gasket. Alternatively, the terraces T can be on the protrusions P of the gasket to result in the same effect of the suction cup. The suction on the connecting surfaces of the gasket or the pipes benefits the coupling of the pipes.

Figure 9:
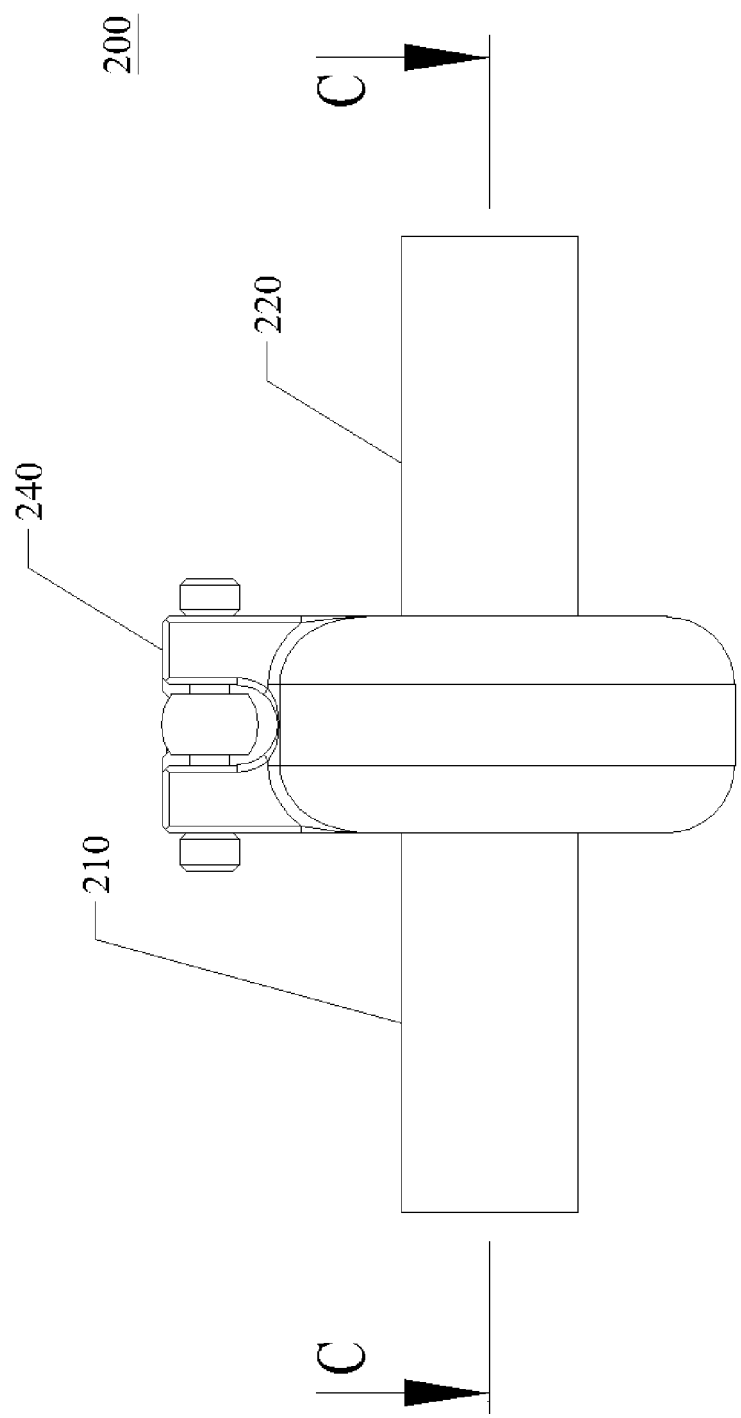
FIG. 9 is a side view of an assembly indicating a cross-section C-C according to an embodiment of the present disclosure.
Figure 10:
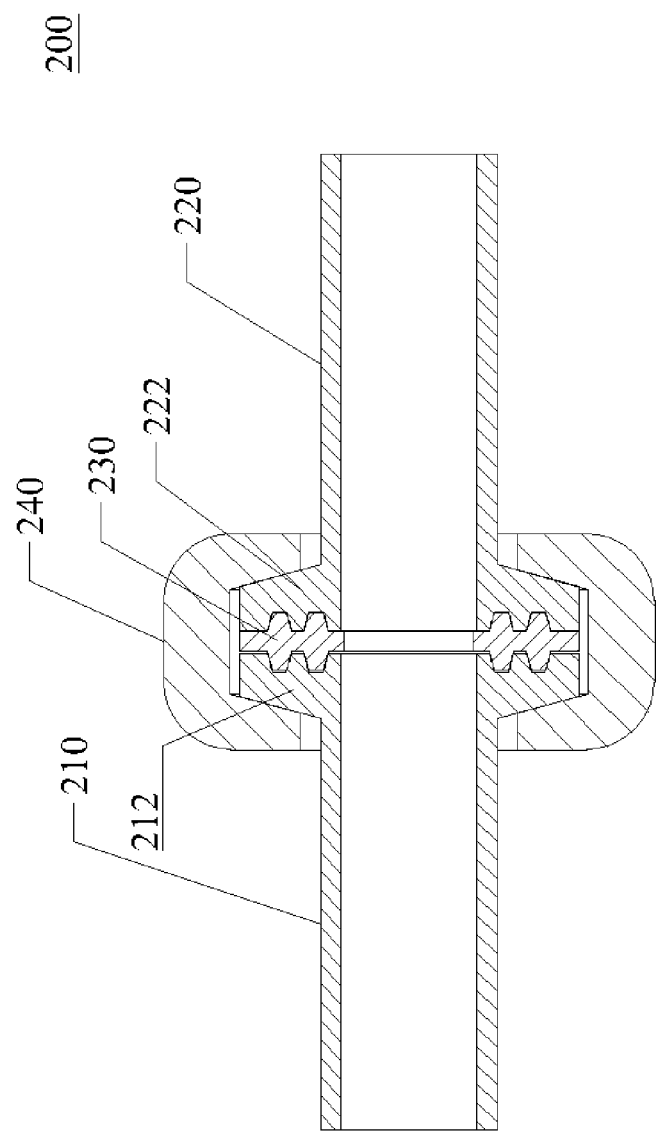
FIG. 10 is a cross-sectional view of the assembly in the cross-section C-C of FIG. 9.

FIG. 9 is a side view of an assembly indicating a cross-section C-C according to an embodiment of the present disclosure, and FIG. 10 is a cross-sectional view of the assembly in the cross-section C-C of FIG. 9. A clamp 240 contains an assembly of the first terminal 212, the second terminal 222 and the gasket 230. As shown in FIG. 10. the clamp 240 has a U-shaped cross-section to fit a cross-section of the assembly of the first terminal 212, the second terminal 222 and the gasket 230.

To sum up, the connector assemblies described in the embodiments of the present disclosure can performed precise and accurate fluid control, and is extremely advantageous as a device used in, for example, a semiconductor production line or a production line of various chemicals.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A pipe joint assembly comprising:
a gasket with a through hole encircled by protrusions on two sides of the gasket;
a first pipe having a first terminal with grooves on a first connecting surface to fit the protrusions of the gasket;
a second pipe having a second terminal with grooves on a second connecting surface to fit the protrusions of the gasket; and
a sleeve containing the first terminal, the second terminal and the gasket,
wherein the sleeve has a first opening at a first end without threads and a second opening at a second end with threads on an inner wall, and
a pin is inserted into the first end of the sleeve to prevent the first terminal from disengaging the sleeve.

2. The pipe joint assembly of claim 1, wherein the pin is U-shaped, and is inserted into the first end of the sleeve through two ends.

3. The pipe joint assembly of claim 2, wherein the first terminal has threads the same as the threads of the second terminal, and thus the first terminal is prevented from being threaded into the second end of the sleeve from the first opening.

4. The pipe joint assembly of claim 1, wherein the second terminal has threads to fit the threads of the second end of the sleeve from the second opening.

5. The pipe joint assembly of claim 1, wherein the sleeve has a texture on an outer wall.

6. The pipe joint assembly of claim 1, wherein the protrusions and the grooves are concentrically circular.

7. The pipe joint assembly of claim 1, wherein the grooves have terraces to leave space between the gasket and the first pipe.

8. The pipe joint assembly of claim 7, wherein the gasket is flexible to compress the space between the gasket and the first pipe when the first pipe is pushed to the gasket.

9. A pipe joint assembly comprising:
a gasket with a through hole encircled by protrusions on two sides of the gasket;
a first pipe having a first terminal with grooves on a first connecting surface to fit the protrusions of the gasket;
a second pipe having a second terminal with grooves on a second connecting surface to fit the protrusions of the gasket; and
a clamp containing the first terminal, the second terminal and the gasket wherein the grooves have terraces to leave space between the gasket and the first pipe.

10. The pipe joint assembly of claim 9, wherein the clamp is flexible and is C-shaped to enclose the assembly of the first terminal, the second terminal and the gasket.

11. The pipe joint assembly of claim 10, further comprising a bolt to close the clamp.

12. The pipe joint assembly of claim 9, wherein the clamp has a U-shaped cross-section to fit a cross-section of the assembly of the first terminal, the second terminal and the gasket.

13. The pipe joint assembly of claim 9, wherein the protrusions and the grooves are concentrically circular.

14. The pipe joint assembly of claim 9, wherein the gasket is flexible to compress the space between the gasket and the first pipe when the first pipe is pushed to the gasket.

15. A pipe joint assembly comprising:
a gasket with a through hole encircled by protrusions on two sides of the gasket;
a first pipe having a first terminal with grooves on a first connecting surface to fit the protrusions of the gasket;
a second pipe having a second terminal with grooves on a second connecting surface to fit the protrusions of the gasket; and
a receptacle containing an assembly of the first terminal, the second terminal and the gasket,
wherein the protrusions have terraces to leave space between the gasket and the first pipe.

16. The pipe joint assembly of claim 15, wherein the gasket is flexible to fill the space between the gasket and the first pipe when the first pipe is pushed to the gasket.

17. The pipe joint assembly of claim 15, wherein the protrusions and the grooves are concentrically circular.

* * * * *